Feb. 23, 1960  S. M. SILVER  2,925,943
METERED DISPENSING CARTON
Filed Nov. 22, 1957  3 Sheets-Sheet 1
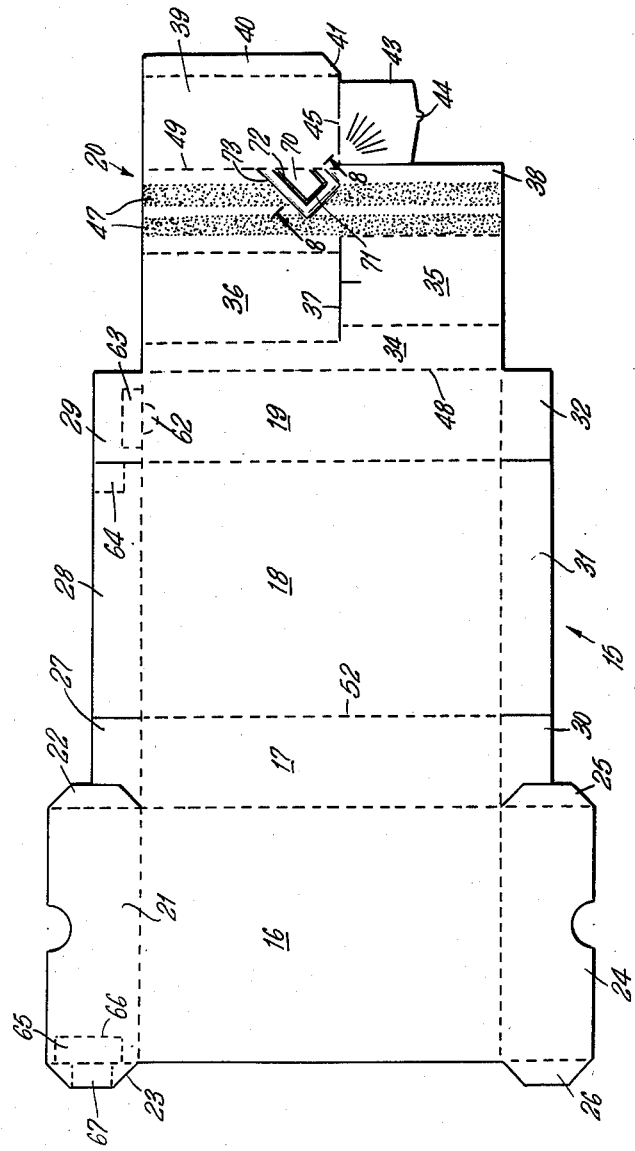
FIG. I
INVENTOR.
STAN M. SILVER
BY
ATTORNEY Feb. 23, 1960  S. M. SILVER  2,925,943
METERED DISPENSING CARTON
Filed Nov. 22, 1957  3 Sheets-Sheet 2
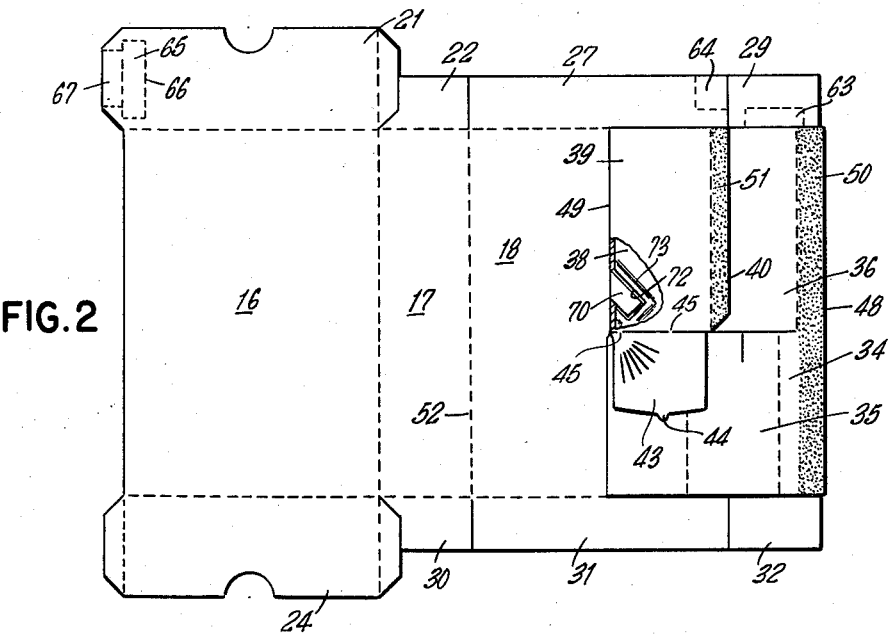
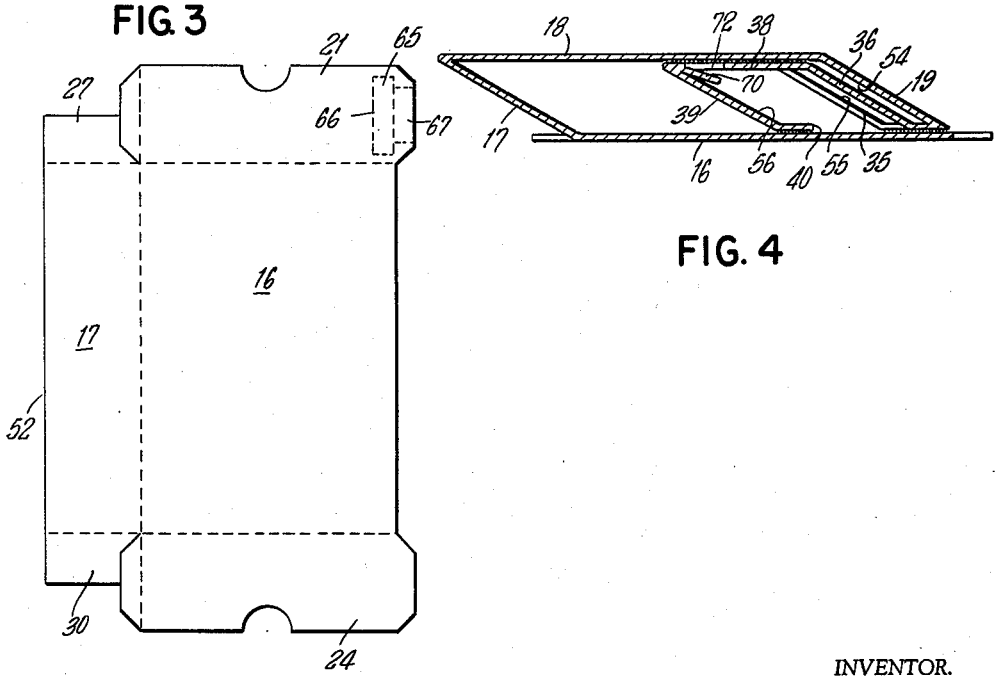
INVENTOR.
STAN M. SILVER
ATTORNEY Feb. 23, 1960 S. M. SILVER 2,925,943
METERED DISPENSING CARTON Filed Nov. 22, 1957 3 Sheets-Sheet 3

INVENTOR.
STAN M. SILVER
BY
ATTORNEY

United States Patent Office 2,925,943
Patented Feb. 23, 1960

2,925,943

METERED DISPENSING CARTON

Stan M. Silver, New York, N.Y.

Application November 22, 1957, Serial No. 698,306

12 Claims. (Cl. 222—425)

The present invention relates to a metered dispensing carton as in an extension of my invention for a one-piece metered dispensing carton, described and claimed in my co-pending application Serial No. 635,413, filed January 22, 1957, and this application is a continuation-in-part of my said co-pending application.

In my said co-pending application I have described and claimed a metered dispensing carton formed of a single blank so cut and scored that it is foldable into a carton having four compartments; namely, an open top metering chamber along a lower portion of an end wall of the carton; a chute of lesser capacity than the metering chamber directly above the metering chamber, extending along the same end wall and continuous with a portion of the thickness of the metering chamber; a supply chamber of greater capacity than the metering chamber alongside of the chute and overlying the other, inner portion of the thickness of the metering chamber and communicating therewith through a common opening in the overlying portion; and a storage chamber or compartment comprising the rest of the carton interior. The supply chamber has as its bottom wall a hinged valve tongue or trap which is movable only in an inward direction into the supply chamber and provides an opening through which material is fed into the supply chamber from the fourth or storage compartment of the carton. In said co-pending application I have also described how a carton so constructed is capable of successively dispensing evenly metered amounts of material, from first to last.

While the carton described and claimed in my said co-pending application is efficient and accurate in its operation, its efficiency is, to an extent, dependent on the accuracy of the cut of the blank and of its setting up into carton form. It has been found that, occasionally, where the cut of the blank is not formed with strict tolerance or where the carton is not set up in accurate rectangular form there is a possibility that the valve tongue may bind against the side walls of the carton to interfere with its efficient operation. It has also been found that, in the latter event, there is a possibility that the stop provided for limiting the inward movement of the valve tongue into the supply chamber will not be effective, so that such tongue may be moved inwardly into the supply chamber during its filling movement, when the carton is inverted, to an extent where it may overbalance and not return to closing position upon the succeeding uprighting movement of the carton, so that the supply chamber contents will mostly return to the storage compartment instead of flowing into the metering chamber.

The present invention is directed to the provision of a one-piece carton of the character described in which tolerances of cutting, scoring and folding are not as critical as in the carton of my co-pending application and in which the valve tongue of the supply chamber will operate with a maximum of certainty and efficiency.

More specifically, the object of the present invention is to provide a one-piece metered dispensing carton of the character described in which means are provided that automatically set up with the squaring of the flat-folded carton blank to serve as a stop for the valve tongue in its inward movement into the supply chamber to prevent its overbalanced movement thereinto.

It is another object of the present invention to provide a carton of the character described with a valve tongue stop that is relatively simple in construction and will not add to the cost of the carton nor in any way complicate the formation of the blank from which it was formed nor the gluing, folding or setting up of the same.

The foregoing and other objects and advantages of the one-piece metered carton of the present invention will become more readily apparent to those skilled in the art from the embodiment thereof shown in the accompanying drawing and from the description following. It is to be understood, however, that such embodiment is shown by way of illustration only, to make the principles and practice of the invention more readily comprehensible, and without any intent of limiting the invention to the specific details therein shown.

In the drawings:

Fig. 1 is a plan view showing the inner face of a blank for forming the carton of the present invention;

Fig. 2 is a plan view of the blank of Fig. 1 shown in an intermediate stage of gluing and folding into a flat tube;

Fig. 3 is a plan view of the completely glued, flat-folded blank of Fig. 1;

Fig. 4 is a section taken on line 4—4 of Fig. 5 showing the glued blank in partly unfolded state, as a first step for setting up;

Figure 5:
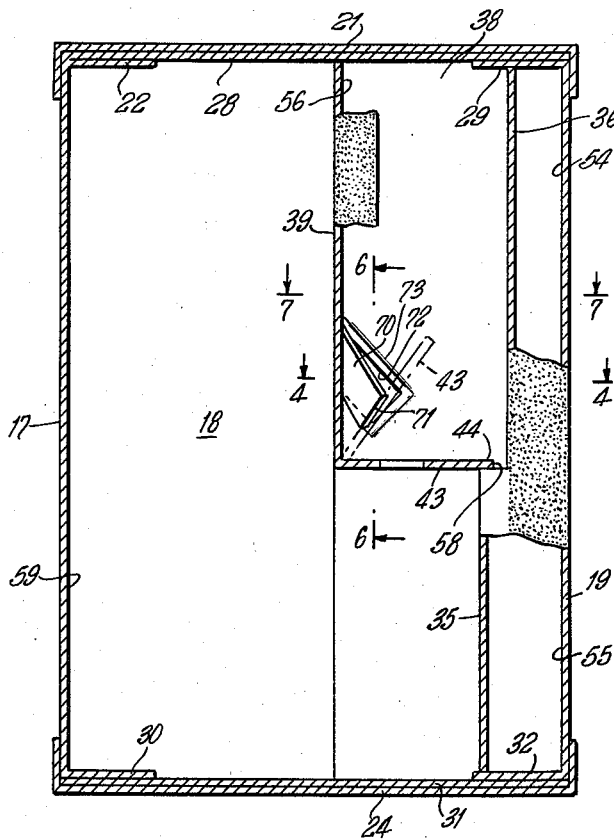
Fig. 5 is an elevational and partly sectional view of the fully set up and closed carton of the present invention; the dotted line showing maximum inner position of the valve tongue thereof.

Referring, now, in greater detail to the illustrative embodiment of the metered dispensing carton shown in the accompanying drawings, the same comprises a cardboard blank, generally designated as 15, preferably cut along the length of a strip of cardboard of the type generally used for the purpose, so that the grain of the cardboard runs with the width of blank 15. The blank 15 is cut and scored to provide the four walls generally required for a carton, including an outer side wall 16, an inner end wall section 17, and inner side wall section 18, and an outer end wall section 19. The blank 15 is also provided with an integral infolding extension 20 on the outer edge of the outer end wall section 19, which constitutes the partitioning means of the carton.

The outer side wall section 16 is formed with a top wall forming flap or extension 21 of a height equal to the projected thickness of the carton and having, at its opposed ends, inner and outer gluing ears 22 and 23, respectively. The outer side wall section 16 is also provided with an integral bottom wall forming flap or extension 24 also of a height equal to the projected thickness of the carton and also having at its inner and outer opposed ends the respective gluing ears 25 and 26. The inner end wall section 17, inner side wall section 18, and outer end wall section 19, are each provided with a top wall forming flap 27, 28 and 29, respectively, each of a height equal to half the projected thickness of the carton or half the height of the flap 21. Similarly, these wall sections are provided at their lower edges with integral bottom wall forming flaps 30, 31 and 32, respectively, each likewise of a height equal to half the projected thickness of the carton or half the height of the adjacent bottom flap 24. The several foregoing wall sections, flaps and gluing ears are defined from one another by scored or similar fold lines, in the conventional manner, and the gluing ears 22 and 25 are formed, in part, from part of their respective adjacent flaps 27 and 30.

The infolding extension 20 is coextensive in height with the adjacent sides and end walls 16–19, is formed without any flaps, either at top or bottom, and is substantially equal in width to width of the flaps 21 and 24 of side wall 16, including their inner and outer gluing ears, so that the blanks 15 may be die cut from a continuous length of cardboard in nested relation, with the side wall 16 of one blank aligned with the extension 20 of the adjacent blank; alternate die cuts forming the bottom edges and the top edges, respectively, of adjacent pairs of blanks 15, with a minimum waste of material.

The partition forming extension 20 of the carton blank 15 is divided, by suitable, vertically extending, scored fold lines, into a gluing strip 34 immediately adjacent the outer end wall 19 and having a wider lower portion; a lower panel 35, equal in width to the projected thickness of the carton, immediately adjacent the wider, lower portion of the gluing strip 34; and upper panel 36 of the same width as panel 35 immediately adjacent to the narrower, upper part of the gluing strip 34, so that it is offset inwardly relative to the lower panel 35; the panels 35 and 36 being separated from one another by a cut line 37 extending their combined widths. The section 20 is further provided, alongside of panels 35 and 36, with a second gluing strip 38 of substantial width and with a wider upper portion alongside of panel 36 and with a narrower lower portion alongside of panel 35; and, alongside of the wider, upper portion of the gluing strip 38, with a panel 39 of the height and width of panel 36 and provided with a gluing tab 40, having a tapered bottom edge 41 along its outer edge, and a dependent tongue 43 at its lower edge.

The tongue 43 is of a length equal to the width of the narrower, lower portion of gluing strip 38 and is preferably provided at its bottom with projection 44, for a purpose that will hereafter be made clear. The tongue 43 is preferably formed with both longitudinal edges slightly inwardly offset relative to the edges of panel 39 and the lower portion of gluing strip 38 extends laterally to underlie the panel 39 up to tongue 43. Thus, the tongue 43 is slightly narrower than the panel 39 from which it extends, and is cut away from panel 39, except for a few spaced narrow bands 45 forming hinges along which the tongue 43 may be bent relative to panel 39.

A diagonally downwardly extending struck out lug 70, having a substantially rectangular inner end 71, is formed in the gluing strip 38 extending from the fold line 49 and terminating a short distance above the bottom edge of panel 39. The lug 70 is preferably separated from the panel 38 by relatively thick cut lines such as are formed by a blunt die edge, so that the edges of the lug 70 are spaced from the edge of the opening 72 formed thereby.

Figure 6:
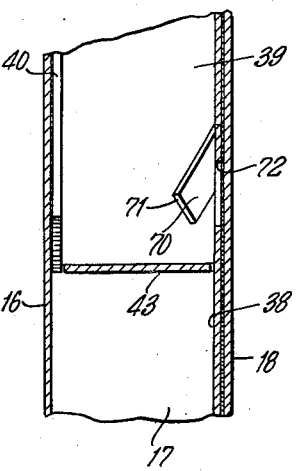
Fig. 6 is a fragmentary section taken on line 6—6 of Fig. 5.
Figure 7:
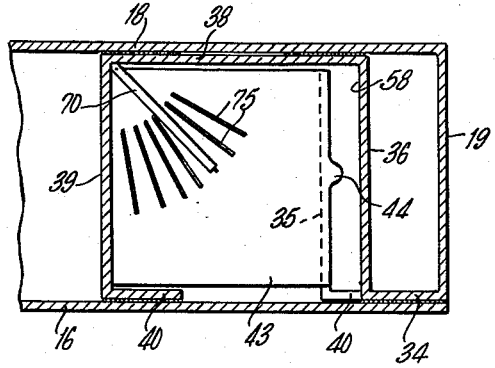
Fig. 7 is a section taken on line 7—7 of Fig. 5.
Figure 8:
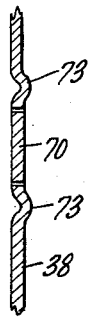
Fig. 8 is an enlarged section taken on line 8—8 of Fig. 1.

The blank 15, which is generally formed of cardboard that has a calendered surface on one side that constitutes the exterior of the carton, may be folded and glued and set up into a carton, as follows:

Spaced, longitudinal lines of adhesive or glue 47 are first applied to the rougher inner surface of the glue strip 38 of the blank 15; with the line of glue adjacent the fold line 49 being interrupted at the lug 70. In order to enable continuous application of glue without having the same coat the inner face of such lug, a glue trap in the form of an embossment 73 is formed around the opening 72. Additionally the lug 70 may be depressed by suitable means into the gluing apparatus to make certain that it is not coated in the course of the application of said lines of glue. The blank is then folded over on itself, along the fold line 48 between the outer end wall 19 and the infolding extension 20, so that the strip 38 is adhesively secured to the inner side wall section 18. The outer portion of the infolding extension 20 is thereafter folded back on itself, along the fold line 49, between panel 39 and gluing strip 38, and strips of adhesive applied to the inner rough face of the gluing tab 40 and to the outer, smooth face of the gluing strip 34 as shown at 50 and 51, respectively, and the blank is then folded over on itself, along fold line 52 between the inner side wall section 18 and the inner end wall section 17, so that side wall section 16 is adhesively secured by its edge portion to the tab 40, to form a tubular flat-folded structure, and gluing strips 34 and 38 are secured to opposed side wall sections 18 and 16, respectively, as will be clearly seen from Fig. 6, wherein the glued, flat, semi-assembled carton is shown partly opened and set up into partly rectangular form.

As the folded and glued blank 15 is moved, by pressing its opposed edges toward one another, into rectangular form, the panels 35, 36 and 39, of the extension 20 are moved into parallel, spaced position relative to the adjoining end wall 19 and to one another; the lower panel 35 being offset further away from end wall 19 relative to the upper panel 36. The upper panel 36 defines, with end wall 19, an open bottom chute 54, and the lower panel 35 defines, with end wall 19, an open top metering chamber 55, which is of greater capacity than the chute 54, by reason of its greater thickness or depth inwardly, and is continuous along a part of such thickness with the chute 54. The panel 39 is disposed inwardly of the panel 36 and parallel thereto and defines, with panel 36, a supply chamber 56, the inner wall of which is formed thereby; its bottom wall being formed by the tongue 43, as will hereafter be explained. The supply chamber 56 is of greater capacity than the metering chamber 55, by reason of the greater width of gluing strip 38 over gluing strip 34, and part thereof overlies the inner portion of the metering chamber 55 and is in communication therewith through the open top of the latter, which forms the communicating opening 58, resulting from the relative offsetting of the panels 35 and 36, along the cut line 37. The remainder of the carton interior constitutes a reserve or storage compartment 59.

After the glued blank 15 is set up into rectangular form, as described above, the top wall of the carton is closed and sealed by first infolding the top flaps 27 and 29; thereafter infolding the top flap 28 and gluing it to flaps 27 and 29; and finally infolding the top flap 21 and gluing it over flap 28 and the exposed portions of flaps 27 and 29, and gluing ears 22 and 23 to the contiguous end walls 17 and 19, respectively.

After the top wall of the carton is sealed, the carton is inverted and the tongue 43 is depressed into horizontal position, preferably by suitable mechanism, as the inverted carton is moved by a conveyor to a filling station, until the projection 44 thereof passes the upper edge of panel 35 and is caught thereagainst, thereby forming a combined bottom wall for the portion of the supply chamber that lies inwardly of the metering chamber, and a one way valve or trap from the storage compartment 59 into the supply chamber 55. In this position, the carton is filled, through its open bottom; with all of its four compartments being filled; the supply chamber 55 being filled through its valve bottom, as the tongue 43 is depressed and bent inwardly thereinto by the weight of material entering the carton.

I have found that when the blank is folded flat, after gluing, and allowed to stay in that position for 24 hours or more, as would be the general practice in carton assembly, the lug 70 has the fibers at its point of junction with the panel 39 more or less permanently stretched so that it is "trained" to lie against the contiguous inner face of panel 39, so that when the glued, flat-folded carton blank is pressed into the rectangular position, the lug 70 will automatically move at least partly with the panel 39, and will serve as a stop to the movement of the tongue inwardly into the supply chamber under the weight of material descending upon it during the filling operation. To ensure interengagement between the lug 70 and the tongue 43 to prevent the pushing of the stop 70 out of the way, a plurality of radially extending scored or cut lines 75 are formed on the smooth supply-chamber-facing side of the tongue, any one of which the edge of the lug 70 may engage to prevent its being pressed out of the way. Thus, the tongue 43 may never become overbalanced and remains in a diagonal position in which it is always capable of receiving the weight of material from the interior of the supply chamber 56 and moved thereby into closed position, whenever the carton is uprighted.

After the carton is thus filled, the bottom wall thereof is sealed by the infolding and gluing together of the bottom wall flaps 30, 32, 31, and 24 and ears 25 and 26, preferably in the order given, and in the same manner as the top wall flaps.

Outlet means are provided in the carton, preferably in the top wall end immediately above the chute 54. Such outlet means may be defined by a knockout piece 62, formed in the top end flap 29 of the end wall 19, which may be formed with an integral tab extending into such end wall, and is suitably detachably formed by an intermittent cut line 63 in the conventional manner. In order to fully expose the knockout piece 62, for tearing away, the registering corner of the overlying flap 28 is cut away, as at 64. A tear away tongue 65 is provided in the overlying outer top wall flap 21 immediately above the knockout piece 62, defined at its inner end by a scored fold line 66 and having an integrally connected extension 67 into and across the gluing ear 23. Such tongue and extension 65 and 67 are left unglued to their underlying carton wall portions and are pulled upwardly to tear them away from adjacent glued down carton wall portions, to expose the knockout piece 62, which is then torn away to provide the requisite outlet opening.

The operation of the metering structure of the carton will now be explained, particularly the features thereof which provide for backflow of material from the filled chute, which permits the exact, accurate metering, even at the first dispensing, in spite of the fact that the chute is filled during the initial filling of the carton.

In obtaining the foregoing, backflow effect, advantage is taken of the fact that it is general usage not to fill cartons of the type to which this invention relates to full capacity; but, generally only to about 90% of capacity. Consequently, when the filled and sealed inverted carton is uprighted, the material therewithin drops to the carton bottom, generally leaving a small, triangular empty space under the supply chamber 56, for the reason that the material cannot flow directly sideways from alongside of the supply chamber to fill the space thereunder that is left by the dropping of the material. This empty space, on the initial uprighting, may be, at most, only partly filled from the supply chamber 56, as the tongue drops into position. This leaves a space in the supply chamber 56 which, on the next inversion of the carton is filled, at least in part, from the metering chamber 55, leaving a space in the latter. This space in the metering chamber is, on the succeeding uprighting of the carton, at least partly filled from the chute 54, thereby partly emptying the latter.

In the carton of the present invention, the need for shaking and agitation of the carton to effect backflow has been eliminated and the back flow of material from the chute 54 to the storage compartment 59 is effected merely by the routine inversion and uprighting of the carton such as is incidental upon the handling and transportation thereof from the place of filling to the hands of the consumer. This elimination of shaking and agitation has been made possible by providing positive means for the slow bleeding or leakage of material from the supply chamber 56 to the empty space below it in the storage compartment 59, upon the upright movement of the carton.

This bleeding or leakage is accomplished, in the illustrative embodiment of the invention, by the narrowing of the tongue 43 to leave openings or spaces between the tongue and adjacent carton wall portions, from the supply chamber to the storage compartment. Such openings are preferably made sufficiently large to permit the dripping of material therethrough under the force of the normal uprighting and inversion movements to which the carton is generally subjected, and sufficiently small to inhibit such movement of material therethrough when the carton is at rest. It will be readily understood, of course, that the size of such openings will vary with the carton for materials of different granular size.

Thus, every time the carton is inverted and uprighted, after the initial filling, a small amount of material from the supply chamber 56 will drop through the openings as the sides of the tongue 43 into the storage compartment 59, leaving a space therein which will be filled partly from the metering chamber upon the next inversion and will be replaced in the metering chamber, upon the next uprighting of the carton, partly from the chute, until the chute is completely emptied. Thus, by the time the carton reaches the consumer to make the first dispensing, only material from the metering chamber will be available for dispensing. After the chute 54 is thus emptied, any backflow from the metering chamber will be wholly replaced from the supply chamber, and the metering chamber will always remain full, as long as material remains in the carton, to assure accurate and uniform metering at each dispensing.

The metered dispensing operation of the carton of the present invention is as follows. As the inversion of the carton for dispensing is begun, the opening 58 between supply chamber 56 and metering chamber 55 is filled and blocked by the carton contents against any interchange of material between the two chambers. This continues to be the situation until the carton reaches the horizontal position. Thereafter, interchange of material between the two chambers is inhibited by gravity. In the last part of the dispensing inversion movement, of course, the supply chamber 56 is replenished through its bottom which is opened by the pressure of the material upon the tongue 43, causing it to move inwardly into the supply chamber until it is stopped by the projection 70. Upon completion of the dispensing movement, the carton is again uprighted. This closes the bottom trap of the supply chamber and the filling of the metering chamber therefrom through the opening 58, in readiness for a new, full and accurate metered dispensing. This operation may be repeated, with comparable results, until the carton is completely emptied.

This completes the description of the metered dispensing carton of the present invention and the method of its operation. It will be apparent that such carton, by reason of its one piece construction which reinforces itself, may be simply and economically produced and set up and that its gluing and assembly may be carried out on any conventional mechanism used for similar non-metering cartons. It will also be apparent that such construction provides a carton that is more certain and more effective in providing for the uniform and accurate dispensing of its contents, from first to last. It will likewise be apparent that such carton is simple and easy to use and requires no skill or training or any extra or unusual effort on the part of the consumer for its efficient use.

It will be further apparent that numerous modifications and variations may be made in the cartons of the present invention in accordance with the principles of the invention hereinabove set forth, without the exercise of any inventive ingenuity. I desire, therefore, to be protected for any and all such modifications and variations that may be made within the spirit of the present invention and the scope of the claims hereto appended.

What I claim is:

1. A metered dispensing container comprising a carton having top and bottom walls and connecting upright walls and partition means within said carton dividing the same into a plurality of compartments, including an upright panel defining the inner wall of a compartment, said panel having a gluing tab whereby said panel is secured to an upright wall of said carton, and a hinged extension at the lower edge of said panel offset in the direction of said tab and underlying and forming a bottom valve for the compartment defined by said panel, means engaging said hinged tongue for limiting its movement away from said compartment and means integral with said gluing tab and extending at an angle thereto inwardly into said compartment and engageable by said extension for limiting the movement thereof into said compartment.

2. The metered dispensing container of claim 1 wherein said upright walls of said carton comprise opposed side and end walls and wherein said partition means are integral with one of said walls and foldable inwardly therefrom into said carton.

3. The container of claim 1 wherein said extension is integral with said panel.

4. The container of claim 1 wherein said means for limiting the inward movement of said extension comprises a lug struck out from said gluing tab and foldable away therefrom to extend into said compartment.

5. The container of claim 1 wherein said means for limiting the movement of said extension comprises an unglued lug struck out from said gluing tab and extending diagonally downwardly from the fold line between said glue tab and said panel to a point above the lower end of said panel.

6. The container of claim 1 wherein said means for limiting the inward movement of said extension comprises a lug struck out from said gluing tab and foldable away therefrom to extend into said compartment to a point above the lower end of said panel, and wherein surface irregularities are provided on the inner face of said tongue engageable with the edge of said lug.

7. A metered dispensing container comprising a carton having top and bottom walls and connecting upright walls and partition means within said carton dividing the same into a plurality of compartments, including an upright panel defining a wall of one of said compartments in the upper portion of said carton, a tongue hinged to a wall of said compartment at the bottom thereof and offset horizontally to form a valve bottom for said compartment; means for limiting the movement of said tongue away from said compartment and means limiting the movement of said tongue into said compartment, said last means comprising a lug extending from an edge of said panel and folded toward said panel inwardly into said compartment at the bottom thereof in position for engaging against said tongue to limit the movement of said tongue into said compartment.

8. The container of claim 7 wherein said lug extends diagonally downwardly from the edge of said panel and is formed with a free end disposed at an angle to said tongue in its bottom-forming position, and wherein the inner face of said tongue is formed with a plurality of elongated irregularities radiating from a common point on the inner surface thereof and selectively engageable by the said inner edge of said lug to inhibit their relative movement when in contact with one another.

9. A metered dispensing container, comprising a carton having top and bottom walls and opposed upright side and end walls, and partition means within said carton dividing the same into a plurality of compartments, including a metering chamber along a lower portion of one of said upright walls and extending part the height thereof, a chute above a portion of said metering chamber and communicating therewith and extending the remainder of the height of said last named upright wall, and a supply chamber inwardly of said chute and alongside thereof and partly overlying said metering chamber, said partition means comprising a cardboard section integral with the edge of a terminal one of said upright walls and foldable inwardly into said carton, said cardboard section cut and scored to define a vertically extending gluing tab adjacent its attached wall section, said gluing tab having a wider lower section defining the width of said metering chamber and a narrower upper portion, defining the width of said chute, a pair of panels, each of a width equal to the width of said adjacent upright wall, one of said panels coextensive in height with the wider portion of said gluing tab and defining the inner wall of said metering chamber, the other of said panels coextensive in height with said narrower portion of said gluing strip and defining the inner wall of said chute, said panels divided by a transverse cut line extending from the inner edge of said upper panel to the outer edge of said lower panel, a second gluing strip coextensive with said panels the upper portion of said second gluing strip defining the width of said supply chamber, a third panel alongside the upper portion of said second gluing strip of equal height and width with said upper panel, and a gluing tab along the outer edge of said third panel, said panel having downwardly extending tongue partly cut away therefrom and offsetable to form a valve bottom for said supply chamber externally of said chute, said second gluing strip having an unglued struck out lug extending therefrom into said supply chamber above the bottom thereof in position to engage said tongue upon its inward movement into said supply chamber to limit such movement thereof.

10. The container of claim 9, wherein said lug extends from said third panel into said gluing strip diagonally downwardly therefrom and is formed with a free edge set at an angle to said tongue when in bottom closing position.

11. The container of claim 10, wherein said lug extends diagonally downwardly from said third panel into said gluing strip and is formed with a free edge set at an angle to said tongue when in bottom closing position, and wherein said tongue is formed with a plurality of elongated irregularities on the inner surface thereof radially disposed from a point opposite the junction of the said third panel with said second gluing strip and engageable by said tongue edge to inhibit their relative displacement upon contact with one another.

12. The container of claim 9, wherein said tongue is formed with an extension on its bottom edge adapted to engage over the edge of said lower panel forming the inner wall of said metering chamber.

References Cited in the file of this patent

UNITED STATES PATENTS

| | | |
|---|---|---|
| 1,931,270 | Rice | Oct. 17, 1933 |
| 2,350,925 | Ramsden | June 6, 1944 |
| 2,801,034 | Silver | July 30, 1957 |